May 28, 1963
C. D'A. HUNT
3,091,525
DEOXIDATION OF REFRACTORY METAL
Filed May 1, 1959
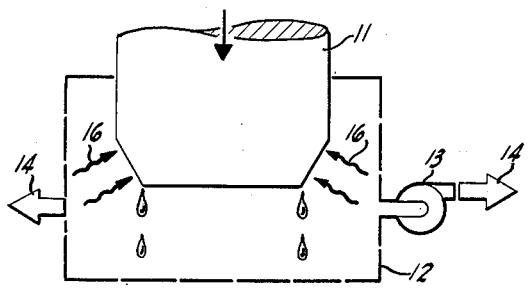
FIG-1
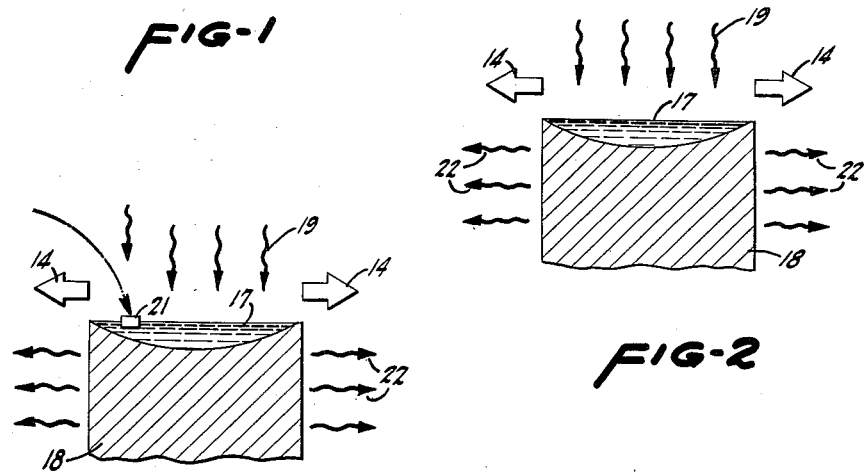
FIG-2
FIG-3
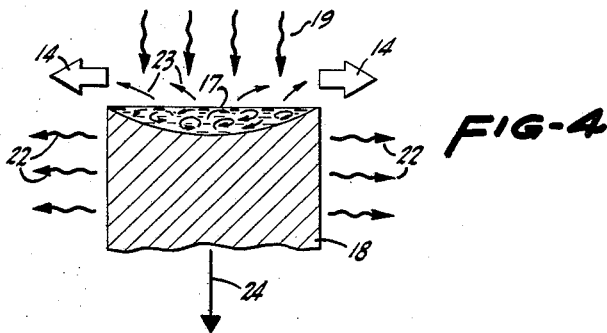
FIG-4
INVENTOR.
CHARLES d'A. HUNT
BY
Lippincott & Ralls
ATTORNEYS

United States Patent Office 3,091,525
Patented May 28, 1963

3,091,525
DEOXIDATION OF REFRACTORY METAL
Charles d'A. Hunt, Orinda, Calif., assignor to Stauffer Chemical Company, New York, N.Y., a corporation of Delaware
Filed May 1, 1959, Ser. No. 810,338
13 Claims. (Cl. 75—84)

The present invention relates to a process of producing highly deoxidized refractory metals to the end of improving the physical properties of the metal so purified.

The process of the present invention is particularly adapted to purification of refractory metal and, thus, although the process may be employed in connection with other metals not properly classified as refractory, the following description is referenced to high temperature metals. The desirability and advantages of materials which will resist change of shape, weight or physical properties at high temperatures have long been recognized and such materials are commonly known as refractories. Although refractories were at one time considered to be limited to materials such as fire-clay, silica, kaolin, diaspor, alumina, and certain products of electric furnaces such as silicon carbide, it has been determined that certain metals exhibit similar high temperature properties as refractories. Such materials are tungsten, molybdenum, tantalum, hafnium, columbium, and the like, and exhibit such high temperature characteristics as to be properly defined as refractory metals. It is with regard to such a general definition that the term "refractory metals" is herein employed, and without attempt to set out particular temperature limits delineating the range of refractory metals.

Despite the undoubted advantages attainable through the utilization of refractory metals, serious limitations upon the widespread application of such metals has resulted from the difficulties of processing same. While the high temperature properties of refractory metal provide at least in part the main advantages thereof, these same high temperature properties impose formidable obstacles to the purification and processing of such metals. It has been necessary to develop entirely new processing methods to produce refractory metals of even minimum purity as, for example, the arc casting process and modifications thereof wherein it is possible to attain sufficient temperatures to melt and form refractory metal. Another difficulty in the wide application of refractory metals is found in certain undesirable properties of the metals themselves. Thus, for example, tungsten is well known to be extremely hard and brittle so that the forming of same into desired physical shapes is extremely complicated, if not impossible, and the resultant utility of elements formed therefrom are in many cases quite limited. Although these difficult characteristics of many refractory metals have long been accepted as a perverse natural fact which cannot be changed and must therefore merely be accepted as a limitation upon utility of the metals, it has been discovered that such is not entirely the case. The commonly accepted physical properties of many refractory metals has been determined to be dependent in part upon impurities present therein. Owing to the grave difficulties encountered in the purification of these metals, truly pure samples thereof have not hitherto been available for analysis.

The present invention provides refractory metals of a purity hitherto unattainable and provides thereby what well may be considered an entirely new class of metals having refractory properties insofar as high temperature is concerned, but without the brittleness and directional physical properties hitherto unavoidably associated with this type of metal.

In particular, it has been determined that the presence of certain materials in refractory metals preferentially congregate at the grain boundaries of the metal and thereby materially contribute to the brittleness and directional properties of the metal. The insolubility of oxygen is contributing to this effect and by the substantial elimination of oxygen from refractory metals it is possible in accordance with this invention to produce high temperature metals such as tungsten, for example, which are quite ductile and readily worked, to thereby provide a major advancement in the art of metallurgy. It has additionally been determined that carbon is sufficiently insoluble in most refractory metal so as to likewise deposit or congregate at the grain boundaries thereof and thereby deleteriously affect the resultant physical properties of the metal. Conventional purification and casting techniques employed with refractory metals are incapable of reducing the oxygen content of such metal to the extent wherein the true physical properties of these metals may even be recognized, let alone utilized. Conventional arccasting techniques, for example, are wholly unsatisfactory in this respect for only in the presence of a substantial gaseous atmosphere is it possible to establish an adequate arc discharge for heating and melting of the metal. The present invention operates to provide a very highly reducing atmosphere at an extremely high temperature wherein deoxidization of the metal is materially furthered.

While it is possible with the highly reducing atmosphere to remove a considerable amount of the oxygen normally included in refractory metal, yet certain of the refractory metals seriously resist this approach. The present invention provides for the removal of oxygen from even the most difficult of metals. It is herein contemplated that refractory metals shall be melted in a high vacuum and shall thereinafter be further heated above the melting point thereof while yet in a high vacuum. To the molten refractory metal there is added another particularly chosen metal which is therein melted to become a solute in the solvent refractory metal under purification. Particular requirements are present as regards the identity and characteristics of the solute additive. The additive serves as a deoxidant and must therefore have a greater affinity for oxygen than the solvent metal under purification. The relative degree of oxygen removal is in part determined by the relative volatility of the deoxidant and the solvent, as set forth in more detail below. Following addition of the deoxidant, a vigorous stirring of the solute and solvent is carried out to thereby thoroughly mix same and furthermore to bring successive molecules to the surface of the molten refractory material under purification. By the proper choice of metal and operating parameters, as set forth below, there is then produced an evaporation or vaporization of suboxides of the deoxidant additive which are preferentially formed in the molten pool and which are subsequently removed from the vicinity of the reaction by the above-noted evacuation. It is possible in accordance with the process of this invention to produce refractory metals having no more than two to three parts per million of oxygen therein, and to thereby produce refractory metals having highly desirable and hitherto unknown physical properties.

It is an object of the present invention to provide an improved process for purification of refractory metal.

It is another object of the present invention to provide an improved process for the deoxidization of refractory metals.

It is a further object of the present invention to provide a process for materially improving and enhancing the physical properties of refractory metals by purification.

It is yet another object of the present invention to provide an improved process for reducing the oxygen content of refractory metals below a concentration which will affect the grain boundaries of the purified metal.

Although the present invention is hereinafter set forth as regards to particular preferred steps thereof, it will be appreciated that various alternatives and modifications therein are possible, and thus no limitation is intended thereby, but instead reference is made to the appended claims for a precise delineation of the true scope of the present invention.

As an aid to the understanding of the following description, there is included herewith a drawing wherein the four figures, FIGS. 1, 2, 3, and 4, schematically illustrate separate steps in the process of this invention.

In accordance with the present invention there is provided a billet, ingot, or stock of refractory material which is melted in a high vacuum. As illustrated in FIG. 1 of the drawing, the melt stock 11 may be fed into an evacuated volume or chamber 12 wherein a high vacuum is maintained by suitable pumping means 13 producing therein a continuous vacuum as indicated by the arrows 14. Liquification of the melt stock 11 is herein accomplished by the application of heat thereto, and in the interest of providing a continuous process the heat may be locally applied as indicated by the arrows 16. Such local application of heat is preferably accomplished by the feeding of the melt stock 11 into one or more high energy electron beams wherein the melt stock is in part bombarded by the beams to thereby impart sufficient heat thereto for liquification of the melt stock. The molten refractory metal obtained by melting of the melt stock 11 is retained in a liquid pool 17, as illustrated in FIG. 2. This molten pool of refractory metal is preferably supported in a shell of the same metal in order that contamination of the purified metal will not result. This pool support may be readily provided by disposing an ingot 18 of purified metal immediately below the melting melt stock 11 so that the molten metal therefrom will flow downward upon the ingot and consequently form a molten pool atop same. Additional heat, as illustrated by the arrows 19 in FIG. 2 of the drawing, is applied to the top of the molten pool, and such heat is again preferably supplied by electron beam bombardment of the pool. In this respect attention is invited to the copending patent application of Charles W. Hanks and myself, entitled "Vacuum Casting By Electron Beams," and filed in the U.S. Patent Office on May 1, 1959 with Serial No. 810,399, wherein there is described the method and means for both bombardment melting of melt stock and subsequent heating of a molten metal pool atop an ingot.

As it is herein contemplated that oxygen shall be removed from the refractory metal by volatilization of a suboxide of the added deoxidant or solute, it thus follows that such suboxide must be preferentially volatilized within the liquid pool of refractory metal. By adding a deoxidant which has a greater affinity for oxygen than the solvent refractory material and which forms a suboxide that is more volatile than the solvent refractory material or any oxide thereof, it thus follows that continued application of heat to the mixture will produce a preferential volatilization of the solute suboxide whereby same is removed from the refractory material. It does not, however, necessarily follow that the solute must be more volatile than the solvent. While it is quite possible for the solute to have a greater volatility than the solvent, yet it is also possible to employ solutes which are less volatile than the solvents. It will be appreciated that in the circumstance wherein the solute is more volatile than the solvent, a certain amount of the solute is vaporized as a metal without opportunity to combine with oxygen in the solvent refractory metal. Thus, in the instance wherein a less volatile solute is employed, a greater time is available for the majority of the solute to circulate through the liquid pool of solvent before being volatilized as a metal and to thereby pick up oxygen molecules and form suboxides therewith for consequent vaporization as a suboxide in accordance with the present invention. Such less volatile solutes may therefore have a lesser affinity for oxygen than those which are more volatile than the solvent. As a further, and by no means unimportant limitation upon the possible solutes that may be employed, it is required that the solute not contaminate the solvent should some be left behind therein during the purification process. This requirement clearly prevents the use of carbon as a solute. It has been determined that the presence of carbon in a refractory material, such as tungsten for example, is quite deleterious to the resultant refractory metal internal structure. Carbon has been determined to be relatively insoluble in the refractory metals and to thereby concentrate upon the grain boundaries thereof and weaken the resultant refractory material. In this respect it appears from purification processes carried out to date that the presence of carbon in quantities less than 20 parts per million does not seriously affect the purified refractory metal; however, when present in greater quantities a relatively undesirable end product results. Inasmuch as the refractory metals herein under consideration for purification by the process of this invention only liquify at very elevated temperatures, it is apparent that a large number of elements are unsuited for use as the solute solely upon the basis of volatility. Thus, those materials which readily and rapidly volatilize at substantially lower temperatures than is required for the liquification of refractory metals will be seen to be wholly unsuited for the present process. Too rapid a volatilization of the added solute will only serve to immediately remove same before it is possible for the solute to form oxides or suboxides that may in themselves volatilize to reduce the oxygen content of the metal under purification.

Following the addition of a suitable solute or deoxidant to the liquid pool of refractory metal, and following suitable stirring of this pool as by thermal gradients induced therein, there will be formed within the pool solute suboxides which have a relatively high vapor pressure. The high volatility of these suboxides thereby promotes their vaporization from the pool and with the continued stirring of the pool such oxides and suboxides as may be formed with the added solute will be exposed to the pool surface to be thereby volatilized whereupon they are immediately removed from the reaction chamber by the continued evacuation thereof. The rate of purification is dependent not only upon the particular deoxidant metal or solute added to the liquid pool, but also is directly proportional to the area of the upper pool surface, as well as to the intensity of stirring in the pool. It is thus highly desirable to employ a relatively large pool wherein the deoxidizing action is carried out. Again, in the interests of providing a continuous purification process, the ingot 18 formed by cooling metal beneath the liquid pool 17, may be continuously or in stepwise fashion withdrawn from the evacuated chamber 12.

As the molten metal in the liquid pool 17 is additionally heated by the application of heat to the upper surface thereof, there is added to this pool a deoxidant metal, as illustrated by the pellet 21 in FIG. 3 of the drawing. This deoxidant metal may be added to the refractory metal undergoing purification in a variety of ways. Thus, for example, there may be directly added to the molten pool 17 small pellets of the deoxidant metal at successive intervals to maintain a desired concentration of such metal within the pool. Alternatively, there may be included in the melt stock 11 a desired proportion of the deoxidant metal whereupon same is liquefied and falls into the molten pool along with the refractory metal undergoing purification. Only a relatively small amount of deoxidant metal need be added to the pool or metal undergoing purification, as for example less than one percent of the pool volume, although the amount varies with the relative volatility of the additive, as is elsewhere discussed. It will be appreciated that upon the insertion of a deoxidant metal into the molten pool 17, such deoxidant is rapidly melted by the heat 19 applied to the pool. Inasmuch as it is a refractory metal which is being herein purified, the heat required to maintain same in a liquid state is quite sufficient to melt the deoxidant metal added thereto. In order to insure a thorough mixing of the deoxidant metal with the refractory metal being purified, there is provided herein a vigorous stirring of the liquid pool 17. In practice such vigorous stirring may be extremely difficult to achieve inasmuch as the temperatures herein involved are of such a high order as to melt any metal employed as a stirring means.

The present invention produces a suitable stirring action by the establishment of substantial thermal gradients in the liquid pool 17. This is herein accomplished by the removal of heat from the metal ingot 18 supporting the liquid pool. Such is illustrated in FIG. 3 of the drawing by the arrows 22, and in practice this cooling of the purified metal in the ingot 18 beneath the pool 17 may be readily accomplished by the provision of a mold about the ingot and the circulation of suitable coolant therethrough. By the application of heat to the top of the liquid pool and the removal of heat from the bottom of same there will be seen to be provided substantial thermal gradients within the pool and it has been found that such thermal gradients will create a vigorous stirring action within the pool whereby a complete mixing of the deoxidant metal with the melted refractory metal is accomplished. A further major point in connection with this stirring is the circulation of the liquid forming the pool 17 in order to continuously raise different portions thereof to the surface whereby evaporation of same is enhanced, such being set forth in more detail below.

The deoxidant material, above identified by the numeral 21, added to the refractory material at such a stage of the process as to form a part of the liquid pool 17, must have certain particular properties to accomplish the objects of the present invention. Thus, the deoxidant or solute, as same may hereinafter be termed inasmuch as the deoxidant does dissolve in the refractory material thereby forming the solvent of the pool, must have a greater affinity for oxygen than does the solvent. It is herein contemplated that the deoxidant metal shall, upon liquification and mixture throughout the refractory metal, form a suboxide of the deoxidant metal. Inasmuch as the solute has a greater affinity for oxygen than does the refractory material, the formation of deoxidant or solute suboxide is thereby preferentially accomplished. Inasmuch as a highly reducing atmosphere is herein employed, the formation of normal and more stable oxides of the solute are quite unlikely.

In preference, there is formed solute suboxides which normally are relatively unstable and, furthermore, have a relatively low boiling point. Specific examples of suitable solutes for certain important refractory metals are set forth below; however, it is a general requirement that the solute have a greater affinity for oxygen than does the solvent refractory material being purified. It is further necessary that the solute not have a sufficiently greater volatility than the refractory metal undergoing purification that the solute immediately evaporate from the liquid pool. It has been determined that the solute should not be more than $10^4$ more volatile than the solvent in order to satisfy this requirement. It is further required of the solute or deoxidant that same will form a suboxide that is in itself more volatile than the solvent or than the solvent oxide or suboxide. While numerous casting and heating processes for metals and for refractory metals are well known to be incapable of producing large ingots of the refractory metal, it is possible in accordance with the method and apparatus of the above-noted patent application to produce ingots of refractory metal having a very substantial cross-section. Consequently, it is thus also possible to produce liquid pools of refractory metal having a very substantial surface area, whereby the purification rate of the present process is materially improved.

As indicated in FIG. 4 of the drawings, vaporized deoxidant suboxide, schematically illustrated by the arrows 23 above the liquid pool 17, continuously evolve from the pool and are likewise continuously removed from the reaction chamber. In those instances wherein a continuous process is envisioned, a continuous pulling of the ingot 18 is accomplished, as indicated by the arrow 24 at the bottom thereof, whereupon the ingot is steadily moved from the cooled mold surrounding same so that a solidified ingot of highly purified refractory metal is continuously withdrawn from the bottom of the mold. By the continuous feeding of the raw metal or melt stock 11 into the evacuated volume or chamber 12, wherein the material to be purified is melted to fall or stream downward into the top of the ingot 18, there is herein accomplished a continuous purification process wherein refractory metals are not only cast but are at the same time deoxidized to such an extent as to produce a resultant ingot of refractory metal wherein the metal forming same has properties hitherto unknown in the art. Ingots formed in accordance with the present invention are found to be highly ductile and to have markedly improved physical characteristics. Furthermore, it is possible in accordance herewith to produce ingots or billets having almost no directional properties and furthermore to produce such metals wherein even very precise and detailed investigation fails to disclose the presence of any grain boundaries therein.

As was pointed out above, the present invention is particularly adapted to the deoxidization of refractory metals. More specifically the present invention is highly advantageous in connection with those refractory metals wherein automatic deoxidization does not occur during particular types of casting or purifying operation otherwise carried out. Thus, for example, the refractory metals having suboxides with a greater volatility than the parent metal are normally deoxidized to a substantial extent by casting processes employing high temperature heating in a high vacuum. Columbium and tantalum are examples of refractory metals having oxides or suboxides which are more volatile than the metal itself. Thus by the melting of these metals in a high vacuum and the maintenance of such melts at a high temperature for a sufficient period of time, there will be produced within the metal such suboxides of the metal as may be volatilized therefrom to thereby reduce the oxygen content of the resultant cast metal. Even with these metals, such as columbium and tantalum, identified above, advantage may well lie in purification of same in accordance with the present invention. As regards other refractory metals, particular attention is invited to the metals tungsten, hafnium and molybdenum which are well known to be highly advantageous as refractory metals and which it has been determined do not form suboxides having a greater volatility than the metal itself, at oxygen concentrations that are deleterious to the ductility.

Thus, by the processing of these refractory metals in accordance with the above-identified method and apparatus in the copending application of Charles Hanks and myself, for example, only a limited deoxidizing effect is realized. Although the deoxidizing effected by such processes is greater by many orders of magnitude than was previously available with conventional casting techniques, it has yet been determined that in accordance with the present invention a substantially greater amount of oxygen may be removed therefrom to thereby produce refractory metals having even greater utility.

As an example of the present invention, consider the element hafnium which has been found not to have oxides or suboxides which are more volatile than the metal itself. In accordance with the present invention, hafnium metal is melted in a high vacuum by bombardment thereof with high energy electron beams. In accordance with the invention hereof, the melted hafnium is flowed into a cooled mold wherein same solidifies, however, further heat is added to the upper surface of the hafnium metal therein, again by electron bombardment of the surface of the metal to thereby produce a liquid metal pool atop an ingot formed within the cooled mold. The application of heat to the top of this liquid pool and the removal of heat from the bottom thereof through the mold will thereby form a concavity or skull forming the undersurface of the pool with a very substantial temperature difference between the bottom and top of the pool whereby a vigorous stirring action results within the pool. To this molten and heated pool of hafnium there are provided small quantities of the metal zirconium. In the example the molten pool is maintained at a temperature in excess of 2500° C. in order to insure the hafnium remaining in a liquid state and inasmuch as this temperature is well above the melting point of zirconium, the zirconium metal is immediately liquified and upon stirring throughout the pool by the stirring action therein, is thoroughly mixed with the hafnium, and in fact dissolved therein.

Although it is well known that zirconium oxide ($ZrO_2$) is quite stable and in fact has a boiling point well above 4000 degrees, there is preferentially produced in the reducing atmosphere of the present process, the relatively unstable zirconium suboxide ($ZrO$). While the properties of zirconium suboxide are not widely published, it has been found that same is readily vaporized at a much lower temperature than might be expected from the known properties of normal zirconium oxide. Inasmuch as the percentage of zirconium in the hafnium pool is relatively small, the volatility or vapor pressure of zirconium is in fact less than that of the hafnium, so that the tendency is for the zirconium to remain in the pool as a metal. Owing to the fact that zirconium has a greater affinity for oxygen than does hafnium, zirconium suboxide is formed within the pool in preference to the oxides of hafnium which might otherwise be formed. This zirconium suboxide formed within the pool is exposed to the extended upper and heated surface thereof by the stirring action in the pool to produce a volatilization of the zirconium suboxide. This zirconium suboxide is quite volatile with respect to the hafnium or to the zirconium itself, and consequently there is produced a preferential vaporization of zirconium suboxide from the pool to thereby materially reduce the concentration of oxygen in the hafnium. In the foregoing instance wherein zirconium is employed as the solute to deoxidize the hafnium, it is not necessary to add an excess of zirconium, for the zirconium metal will normally remain within the hafnium pool in preference to volatilization therefrom as a metal.

An alternative deoxidant which may be employed with hafnium is titanium which, however, is relatively volatile with respect to the hafnium metal being purified. Here again in this instance, the solute titanium has a much greater affinity for oxygen than does hafnium, so that titanium suboxide is preferentially formed within the stirred molten pool of hafnium containing a certain amount of dissolved titanium. This titanium suboxide is much more volatile than is hafnium so that the titanium suboxide is preferentially volatilized from the upper pool surface to be removed from the processing chamber by the continued evacuation thereof. Inasmuch as the titanium is relatively volatile within the pool as a metal, a certain proportion of the titanium will be seen to volatilize as a metal before combining with molecules of oxygen to form the desired titanium suboxide. In this instance it is necessary to employ an overabundance of titanium from that which might theoretically be required to capture the majority of the oxygen present within the hafnium.

As a further example of the process of the present invention, the metal molybdenum may be deoxidized in accordance herewith. Following the melting of molybdenum in a high vacuum by electron beam bombardment and the establishment of a liquid pool thereof of substantial surface area supported by purified molybdenum in accordance with the present invention, such pool is further heated by the application of heat to the upper surface thereof and cooled by the removal of heat from the bottom surface of the pool to thereby establish vigorous stirring action within the pool. To this pool of molten molybdenum, which will be noted to be maintained at a temperature well in excess of the melting point of molybdenum, there may be added a relatively small amount of titanium metal. Such added titanium is immediately melted and dissolved in the molybdenum and is stirred therethrough. Titanium metal has a greater affinity for oxygen than does molybdenum and consequently within the liquid pool there are formed titanium suboxides. These titanium suboxides are more volatile than molybdenum so that they are preferentially evaporated from the pool to be thereby removed from the processing area by the continued evacuation above the pool. Inasmuch as titanium metal is relatively volatile with respect to molybdenum it will be appreciated that an overabundance of titanium should be added in accordance with the present process in order that despite the evaporation of a certain portion of the titanium metal as such, there yet remains sufficient titanium metal to react with the oxygen in the molybdenum pool to remove the desired amount of oxygen from the molybdenum. In contrast to the addition of titanium to the molten molybdenum, there may be employed a solute which is relatively less volatile than molybdenum. Such materials include zirconium, columbium and tantalum. All of these metals noted above have lower vapor pressures in the amounts added than does the molybdenum of the pool, and thus need be added only in such quantities as are necessary to react with oxygen in the molten molybdenum to form suboxides of the solute added. Zirconium, columbium, and tantalum each have a greater affinity for oxygen than does molybdenum and will thus preferentially form suboxides in the molten molybdenum pool, rather than allowing the formation of molybdenum oxides or suboxides therein. As previously noted, the relatively non-volatility of the additives zirconium, columbium, and tantalum, allow these elements to remain in the molten molybdenum pool for a relatively longer period than titanium without being evaporated therefrom as a metal. It is in fact in general only after the formation of suboxides of these additives that there in produced a resultant material which has a greater volatility than the molybdenum so as to preferentially be vaporized in the molten pool thereof. As regards the relative volatility of the additives in this and other examples of the present invention, it is to be noted that it is the relative vapor pressures of the materials in the molten pool which are determinative. Thus, although the vapor pressure of an additive metal may in itself be greater than the vapor pressure of the metal to which it is added, in the proportions of the metals within the pool, the resultant vapor pressure of the additive may well be much less than that of the solute forming the majority of the pool.

A further example of the present invention is the deoxidization of tungsten. It is well known that the element tungsten has a higher melting point than any other known metal and an extremely low vapor pressure. As a consequence of these characteristics the tungsten metal is highly desirable for numerous applications, however, also as a consequence of these characteristics the processing of this metal is extremely difficult. In accordance with the present invention there is encountered no difficulty in melting and further heating tungsten to thereby produce a molten pool of substantial surface area thereof wherein the addition of heat to the upper surface and the removal of heat from the bottom surface produces vigorous stirring action within the pool. Removal of oxygen from tungsten in accordance with the present invention may be accomplished by the addition of zirconium metal to the molten tungsten. Even in relatively small proportions, zirconium is relatively volatile with respect to tungsten, i.e., the vapor pressure of a small percentage of zirconium in molten tungsten is yet greater than the vapor pressure of the tungsten in which the zirconium is dissolved. Zirconium does, however, have a much greater affinity for oxygen than does tungsten, so that upon the addition of zirconium to the molten tungsten there is preferentially formed within the agitated liquid mixture thereof zirconium suboxide which is even more volatile than the zirconium itself. By the addition of a suitable overabundance of zirconium, there is consequently produced sufficient zirconium suboxide in the tungsten to remove substantially all of the oxygen from the tungsten and to transpose same into the zirconium suboxide. Even though a certain proportion of the additive zirconium is vaporized as a metal, yet by the provision of a suitable over-abundance of the zirconium, there remains a sufficient amount thereof to remove substantially all of the oxygen within the tungsten pool. Consequently, there is evaporated from the pool at the upper surface thereof zirconium suboxide, to thereby remove oxygen from the tungsten and consequently to produce a relatively oxygen-free tungsten metal.

Another suitable additive to deoxidize tungsten in accordance with the process of the present invention is columbium. In the proportions required to be added to the tungsten for the columbium to pick up substantially all of the oxygen therein, the columbium has somewhat the same vapor pressure as the tungsten in which it is dissolved. It is thus not necessary to add a substantial overabundance of columbium to the tungsten in order for the columbium to form a suboxide which may be volatilized from the liquid pool. Inasmuch as columbium again has a much greater affinity for oxygen than does tungsten, there is preferentially formed in the solution, columbium suboxide which has a materially greater volatility than either columbium or tungsten and is consequently preferentially evaporated from the pool. A further additive which may be employed to deoxidize tungsten in accordance with the present invention is tantalum. Even though tungsten is well known to have the highest melting point of any metal and consequently to have a very low vapor pressure, tantalum is sufficiently close thereto in physical properties that when added to the molten tungsten pool in such quantities as would theoretically be required to pick up substantially all of the oxygen within the tungsten, the tantalum metal has a relatively less volatility than the tungsten. In other words tantalum, in the small percentage required to be added to the tungsten pool, has a lesser vapor pressure than the tungsten solvent to which the tantalum is added. Thus, again, the tantalum having a greater affinity for oxygen than does tungsten still produces a tantalum suboxide by attachment of oxygen molecules to the tantalum atoms within the pool so as thereby to form a relatively volatile suboxide which is preferentially evaporated from the tungsten pool.

It is to be particularly noted that certain advantages accrue to the use of volatile additives and certain other advantages accrue to the use of relatively non-volatile additives in accordance with the present invention. Thus those deoxidants which may be added to the refractory metal undergoing purification in accordance with the present invention which are relatively volatile even in small percentages as regards the solvent refractory metal, will be seen to leave no possible residue of additive within the purified refractory metal. With the additive having a greater volatility than the metal undergoing purification, the probability of substantially complete volatilization of the additive metal either as a metal or as a suboxide thereof will be seen to be very great. This is highly advantageous for certain applications. Alternatively, the utilization of relatively non-volatile additives or deoxidants to the refractory metal undergoing purification has the advantage that the metal is not preferentially evaporated from the molten pool as a metal. To the contrary, such additives tend to remain in the molten pool until they have, in fact, reacted with the oxygen therein to form suboxides which are in themselves more volatile than either the additive or the solvent of the pool. This has the particular advantage of requiring less additive, producing less metal vapor above the pool, and of further insuring the relatively complete removal of oxygen from the refractory metal undergoing purification. It does have the possible disadvantage, however, of leaving a certain residue of the deoxidant metal in the refractory metal undergoing purification. Inasmuch as a relatively non-volatile additive will be seen to tend to remain in the pool without evaporation therefrom unless it forms a volatile compound, the chances will be appreciated to be much greater that a certain amount of such additive metal may yet remain within the pool and solidify at the bottom thereof to form a part of the resultant purified refractory metal.

In many instances this is not only of no particular disadvantage, but to the contrary is of certain advantage. The additive deoxidant herein employed dissolves in the solvent refractory metal undergoing purification and consequently will not migrate to or concentrate upon grain boundaries to thereby reduce or deleteriously affect the physical properties of the resultant purified refractory metal. To the contrary, certain alloys formed in accordance with the present invention wherein relatively non-volatile additives remain in solution in the liquid refractory metal undergoing purification have highly desirable properties. Thus, the choice of deoxidants employed in the process of this invention will be seen to be in part determined by the particular end product required or desired. By employing one of the possible deoxidants having the required characteristics, as generally set forth above, and as more specifically identified in the examples above, it is herein possible to produce highly deoxidized refractory metal having particularly desirable physical properties which are in part determinable by the choice of deoxidants.

What is claimed is:

1. A process for removing an oxygen impurity from a high melting temperature refractory metal selected from the group consisting of hafnium, molybdenum, tungsten, columbium and tantalum which comprises steps of heating said refractory metal in a highly evacuated atmosphere to form a molten pool of solvent metal, selecting a purifying solute metal having a greater affinity than said solvent metal for said oxygen from the group of metals consisting of zirconium, titanium, columbium and tantalum, said solute metal forming with said oxygen a compound having a substantially greater volatility than said solvent metal whereby said compound readily vaporizes out of said solvent metal pool in said highly evacuated atmosphere, incorporating within said molten pool of solvent metal a minor amount of said solute metal sufficient to combine with a substantial amount of said oxygen, said solute metal being not more than $10^4$ more volatile than said solvent metal to cause it to remain within said pool long enough to form said compound with a substantial amount of said oxygen, and maintaining said pool at a temperature high enough to readily vaporize out said compound and low enough to substantially retain said solvent metal in said pool.

2. A process as set forth in claim 1 wherein said refractory metal is heated in an electron beam furnace.

3. A process as set forth in claim 1 wherein said solute metal has a greater volatility than said solvent metal to permit it to be selectively vaporized out of said pool.

4. A process as set forth in claim 1 wherein said solute metal has a lesser volatility than said solvent metal and is compatible with it to permit it to remain in combination with said refractory metal after said impurity has been removed from the solvent without impairing the properties of said refractory metal.

5. A process as set forth in claim 1 wherein said solvent metal is hafnium and said solute metal is zirconium.

6. A process as set forth in claim 1 wherein said solvent metal is hafnium and said solute metal is titanium.

7. A process as set forth in claim 1 wherein said solvent metal molybdenum and said solute metal is zirconium.

8. A process as set forth in claim 1 wherein said solvent metal is molybdenum and said solute metal is titanium.

9. A process as set forth in claim 1 wherein said solvent metal is molybdenum and said solute metal is columbium.

10. A process as set forth in claim 1 wherein said solvent metal is molybdenum and said solute metal is tantalum.

11. A process as set forth in claim 1 wherein said solvent metal is tungsten and said solute metal is zirconium.

12. A process as set forth in claim 1 wherein said solvent metal is tungsten and said solute metal is columbium.

13. A process as set forth in claim 1 wherein said solvent metal is tungsten and said solute metal is tantalum.

References Cited in the file of this patent

UNITED STATES PATENTS

| | | |
|---|---|---|
| 1,896,606 | Bates | Feb. 7, 1933 |
| 2,773,787 | Rick | Dec. 11, 1956 |
| 2,809,905 | Davis et al. | Oct. 15, 1957 |
| 2,866,700 | Bohnet et al. | Dec. 30, 1958 |
| 2,946,834 | Junker | July 26, 1960 |